(12) United States Patent
Doe et al.

(10) Patent No.: US 8,951,676 B2
(45) Date of Patent: Feb. 10, 2015

(54) NON-AQUEOUS ELECTROLYTE FOR HIGH VOLTAGE RECHARGEABLE MAGNESIUM BATTERIES

(71) Applicants: Robert Ellis Doe, Norwood, MA (US); George Hamilton Lane, St. Helens (AU); Robert E. Jilek, Belmont, MA (US); Jaehee Hwang, Cambridge, MA (US)

(72) Inventors: Robert Ellis Doe, Norwood, MA (US); George Hamilton Lane, St. Helens (AU); Robert E. Jilek, Belmont, MA (US); Jaehee Hwang, Cambridge, MA (US)

(73) Assignee: Pellion Technologies, Inc., Cambridge, MA (US)

( * ) Notice: Subject to any disclaimer, the term of this patent is extended or adjusted under 35 U.S.C. 154(b) by 142 days.

(21) Appl. No.: 13/803,456

(22) Filed: Mar. 14, 2013

(65) Prior Publication Data

US 2014/0099557 A1    Apr. 10, 2014

Related U.S. Application Data

(60) Provisional application No. 61/613,063, filed on Mar. 20, 2012.

(51) Int. Cl.
| | |
|---|---|
| *H01M 2/16* | (2006.01) |
| *H01M 10/0568* | (2010.01) |
| *H01M 10/056* | (2010.01) |
| *H01M 10/054* | (2010.01) |
| *H01M 10/0567* | (2010.01) |

(52) U.S. Cl.
CPC ........ *H01M 10/0568* (2013.01); *H01M 10/056* (2013.01); *H01M 10/054* (2013.01); *H01M 10/0567* (2013.01)
USPC ...... 429/251; 429/231.95; 429/324; 429/325; 429/331; 429/337

(58) Field of Classification Search
CPC ............ H01M 10/00; H01M 2300/00; H01M 10/054; H01M 10/0568; H01M 10/0565; H01M 2300/0025
USPC .............. 429/188, 199, 218.1, 231.6, 231.95, 429/251, 25, 324, 325, 331, 337, 344
See application file for complete search history.

(56) References Cited

U.S. PATENT DOCUMENTS

| | | | | |
|---|---|---|---|---|
| 2002/0110739 | A1* | 8/2002 | McEwen et al. | 429/324 |
| 2012/0107698 | A1* | 5/2012 | Muldoon et al. | 429/337 |

* cited by examiner

*Primary Examiner* — Patrick Ryan
*Assistant Examiner* — Ben Lewis
(74) *Attorney, Agent, or Firm* — Milstein Zhang & Wu LLC; Joseph B. Milstein (57) ABSTRACT

An electrolyte for use in electrochemical cells is provided. The properties of the electrolyte include high conductivity, high Coulombic efficiency, and an electrochemical window that can exceed 3.5 V vs. $Mg/Mg^{+2}$. The use of the electrolyte promotes the electrochemical deposition and dissolution of Mg without the use of any Grignard reagents, other organometallic materials, tetraphenyl borate, or tetrachloroaluminate derived anions. Other Mg-containing electrolyte systems that are expected to be suitable for use in secondary batteries are also described.

19 Claims, 4 Drawing Sheets

NON-AQUEOUS ELECTROLYTE FOR HIGH VOLTAGE RECHARGEABLE MAGNESIUM BATTERIES

CROSS-REFERENCE TO RELATED APPLICATIONS

This application claims priority to and the benefit of U.S. provisional patent application Ser. No. 61/613,063, filed Mar. 20, 2012, which application is incorporated herein by reference in its entirety.

STATEMENT REGARDING FEDERALLY FUNDED RESEARCH OR DEVELOPMENT

This invention was made with government support under award number DE-AR0000062, awarded by Advanced Research Projects Agency-Energy (ARPA-E), U.S. Department of Energy. The government has certain rights in the invention.

FIELD OF THE INVENTION

The invention relates to electrolytic solutions in general and particularly to an electrolyte that comprises magnesium ions as the charge carrier.

BACKGROUND

A variety of rechargeable, high energy density electrochemical cells have been demonstrated although the most widely utilized commercial system is that based upon Li-ion chemistry because it displays very high energy density. Such cells usually include a transition metal oxide or chalcogenide cathode-active material, an anode-active lithium metal or lithium intercalation or alloy compound such as graphitic carbon, tin and silicon, and an electrolytic solution containing a dissolved lithium-based salt in an aprotic organic or inorganic solvent or in a polymer. Today there is great demand for energy storage devices capable of storing more energy per unit volume or per unit mass, e.g., Watt-hours per liter (Wh/l) or Watt-hours per kilogram (Wh/kg), than premier rechargeable Li-ion batteries are capable of delivering. Consequently an increasingly sought after route to meeting this demand higher energy density is to replace the monovalent cation lithium (Li) with divalent magnesium cations ($Mg^{2+}$) because magnesium can enable nearly twice the charge of $Li^+$ to be transferred, per volume. Furthermore the abundance of Mg metal and readily available compounds containing Mg is expected to offer significant cost reduction relative to Li-ion batteries. Magnesium also offers superior safety and waste disposal characteristics.

Electrolytes utilizing an alkali metal with organic ligands from organometallic species have been described. Generally the use of an alkaline earth metal anode such as magnesium would appear disadvantageous relative to the use of an alkali metal such as lithium because alkali metal anodes are much more readily ionized than are alkaline earth metal anodes. In addition, on recharge the cell should be capable of re-depositing the anode metal that was dissolved during discharge, in a relatively pure state, and without the formation of deposits that block the electrodes. One practiced in the art would note this characteristic is not natural for Mg. Despite this, there are numerous other disadvantages to alkali batteries. Alkali metals, and lithium in particular, are expensive and highly reactive. Alkali metals are also highly flammable, and fire caused by the reaction of alkali metals with oxygen, water or other reactive materials is extremely difficult to extinguish. As a result, the use of alkali metals requires specialized facilities, such as dry rooms, specialized equipment and specialized procedures, and shipment of Lithium containing products (e.g., batteries) is tightly controlled. In contrast, magnesium metal and its respective inorganic salts are easy to process and usually are considered as benign. Magnesium metal is reactive, but it undergoes rapid passivation of the surface, such that the metal and its alloys are highly stable. Magnesium is inexpensive relative to the alkali metals, and widely used as ubiquitous construction materials.

Known electrolytes that enable reversible, electrochemical deposition of Mg and that have potential use in a battery contain organometallic materials. Most often these electrolytes contain organometallic Grignard salts as the electrochemically active component. However sustaining anodic limits greater than 1 Volt is problematic or impossible with the usual intercalation cathodes because of electrolyte decomposition and corresponding encrustation and/or passivation of electrode surfaces. The anodic limit, or anodic voltage, is a measure of an electrolytes stability limit; represented as the highest voltage that can be applied to the electrolyte prior to initiating oxidative decomposition of the electrolyte at an electrode surface. Enhanced electrochemical stability has been demonstrated by complexing Grignard reagents with strong Lewis acids. For example, a cell comprised of a magnesium metal anode, a molybdenum sulfide "Chevrel" phase active material cathode, and an electrolyte solution derived from an organometallic complex containing Mg is capable of the reversible, electrochemical plating of magnesium metal from solutions with about a 2 V anodic limit of the stability window. Under the same principle similar results have also been shown when Magnesium Chloride and organometallic Aluminum compounds complexes are employed.

Such cells are low energy density due to a low difference in operating potentials between a Chevrel cathode and Mg metal anode and therefore are not commercially viable cells. Sustaining an anodic voltage greater than 2 volts is problematic or impossible with the usual intercalation cathodes and electrolytes based upon Grignard reagents and other organometallic species. Magnesium batteries operating at voltages greater than 1.5 volts are particularly prone to electrolyte decomposition and to encrustation and/or passivation of the electrode surface due to anodic limits of the electrolyte. Furthermore electrolytes intended for use in electrochemical cells in which the plating and stripping of Mg ions is required include organometallic species among the ionic species in the respective electrolytic solutions. There are many disadvantages to organometallic species, relative to inorganic salts. Practically, all organometallic species of the alkalis and the earth alkalis are highly unstable in the presence of air and water and thus are classified as pyrophoric. Organometallic species of sufficient purity are quite expensive to produce. Organometallic species introduce organic ligands into the electrolytic solution, which will limit the chemical stability of the solution when in contact with certain electrode active materials and other electrochemical cell components. In general, handling, manipulation and storing organometallic species of this sort are complicated, hazardous and expensive.

In contrast one practiced in the art will recognize that previous attempts to utilize inorganic magnesium salts failed to enable substantial reversibility of magnesium deposition with high Coulombic efficiency and low overpotential. In general it has been shown that electrodeposition in previous inorganic magnesium salt solutions corresponded with electrolyte consumption and resulted in decomposition of the solution components. The decomposition products passivate the electrode blocking in further electrochemical reaction. Consequently no commercial Mg secondary batteries have succeeded thus far.

The literature on Mg secondary batteries includes N. Amir et al., "Progress in nonaqueous magnesium electrochemistry," Journal of Power Sources 174 (2007) 1234-1240, published on line on Jun. 30, 2007; Y Gofer et al., "Magnesium Batteries (Secondary and Primary)," published in Encyclopedia of Electrochemical Power Sources 2009 285-301 Elsevier B. V.; and John Muldoon et al., "Electrolyte roadblocks to a magnesium rechargeable battery," 5 (2012) Energy & Environmental Science 5941-5950.

Also previously described is Aurbach et al. in U.S. Pat. No. 6,316,141, issued Nov. 13, 2001, which is said to disclose a cell comprised of a Magnesium metal anode, a Molybdenum Sulfide "Chevrel" phase active material cathode, and an electrolyte solution derived from an organometallic complex containing Mg. The critical aspect of that invention is the specification of an electrolyte capable of the reversible, electrochemical plating of Magnesium metal from solutions with a 2 V anodic limit. This was demonstrated through the formation of complex electrolytically active salts represented by the formula: $M'^{+m}(ZR_nX_{q-n})_m$ in which: M' is selected from a group consisting of magnesium, calcium, aluminum, lithium and sodium; Z is selected from a group consisting of aluminum, boron, phosphorus, antimony and arsenic; R represents radicals selected from the following groups: alkyl, alkenyl, aryl, phenyl, benzyl, and amido; X is a halogen (I, Br, Cl, F); m=1-3; and n=0-5 and q=6 in the case of Z=phosphorus, antimony and arsenic, and n=0-3 and q=4 in the case of Z=aluminum and boron.

In a different report Nakayama et. al., U.S. Patent Application Publication No. 2010/0136439, published Jun. 3, 2010, which is said to disclose a magnesium ion-containing nonaqueous electrolytic solution comprising a magnesium ion and another kind of a metal ion dissolved in an organic solvent, wherein solutions may be obtained through combinations of inorganic Lewis Base $MgCl_2$ and organometallic Aluminum Lewis Acids such as dimethylaluminum chloride or methylaluminum dichloride.

Also described is Yamamoto et al., U.S. Patent Application Publication No. 2009/0068568, published Mar. 12, 2009, which is said to disclose a magnesium ion containing nonaqueous electrolyte in which magnesium ions and aluminum ions are dissolved in an organic ethereal solvent, and which is formed by adding metal magnesium, a halogenated hydrocarbon, an aluminum halide $AlY_3$, and a quaternary ammonium salt to an organic ethereal solvent and applying a heating treatment while stirring them as a one-step reaction to form the Grignard-based organometallic containing complex solution species.

There is a need for improved non-aqueous electrolytes for use in secondary batteries.

SUMMARY OF THE INVENTION

An electrolyte for use in electrochemical cells is provided. The properties of the electrolyte include high conductivity, high Coulombic efficiency, and an electrochemical window that can exceed 3.5 V vs. $Mg/Mg^{+2}$. The use of the electrolyte promotes the electrochemical deposition and dissolution of Mg without the use of any Grignard reagents, organometallic materials, or Lewis acid derived anions including tetrachloroaluminate or tetraphenylborate.

According to further features in preferred embodiments described below, the electrolyte is incorporated into specific Mg-ion electrochemical cells comprised of said electrolyte and an appropriate anode-cathode pair. In one aspect an appropriate anode-cathode pair is a magnesium metal anode and a magnesium insertion-compound cathode. In another aspect an appropriate anode-cathode pair is a magnesium metal anode and a cathode capable of conversion, or displacement reactions. In yet another aspect an appropriate anode-cathode pair is a magnesium metal anode and a catholyte.

In some specific embodiments described herein solutions formed from combinations of Magnesium Chloride ($MgCl_2$) and Magnesium bis(trifluoromethylsulfonyl)imide ($MgTFSI_2$) in ethereal solvents such as THF and Glyme successfully address the shortcomings of the previously reported Mg electrolytes and provide a basis for the production of a viable, rechargeable magnesium battery with a voltage exceeding a 2 Volt stability window.

The significantly wider electrochemical window obtained using electrolytes described herein indicates improved stability for the electrolytic solution and allows the use of more energetic cathode materials, such that both the cycle life and the energy density of the battery are substantially increased. Furthermore the present invention enables cheaper, safer, and more chemically stable materials to be utilized for these purposes.

According to one aspect, the invention features a non-aqueous electrolyte solution for use in an electrochemical cell. The non-aqueous electrolyte solution comprises at least one organic solvent; and at least one electrolytically active, soluble, inorganic Magnesium (Mg) salt complex represented by the formula $Mg_{n+1}X_{(2*n)}Z_2$ in which n is in the range from one-quarter to four, X is a halide, and Z is an inorganic polyatomic monovalent anion.

In one embodiment, the Z is a polyatomic monovalent anion selected from the group of polyatomic monovalent anions described in Table I, and mixtures thereof.

In another embodiment, the n is in the range from 0.25 to 4, the halide is chlorine.

In yet another embodiment, the n is in the range from 0.25 to 4, the halide is chlorine, and Z is $N(CF_3SO_2)_2^{-1}$.

In still another embodiment, a Mg molarity is in the range from 0.1 M to 2 M.

In a further embodiment, a solution conductivity is greater than 1 mS/cm at 25 degrees Celsius.

In yet a further embodiment, a solution Coulombic efficiency is greater than 98% at 25 degrees Celsius.

In an additional embodiment, the at least one organic solvent is a solvent selected from the group consisting of an ether, an organic carbonate, a lactone, a ketone, a glyme, a nitrile, an ionic liquid, an aliphatic hydrocarbon solvent, an aromatic hydrocarbon solvent and an organic nitro solvent, and mixtures thereof.

In one more embodiment, the at least one organic solvent is a solvent selected from the group consisting of THF, 2-methyl THF, dimethoxyethane, diglyme, triglyme, tetraglyme, diethoxyethane, diethylether, proglyme, ethyl diglyme, butyl diglyme, dimethylsulfoxide, dimethylsulfite, sulfolane, ethyl methyl sulfone, acetonitrile, hexane, toluene, nitromethane, 1-3 dioxalane, 1-4 dioxane, trimethyl phosphate, tri-ethyl phosphate, hexa-methyl-phosphoramide (HMPA), N,N-propyl-methyl-pyrrolidinium-bis(trifluoromethylsulfonyl) imide (P13-TFSI), N,N-propyl-methyl-pyrrolidinium-diacetamide (P13-DCA), propyl-methyl-pyrrolidinium-bis (fluorosulfonyl)imide (P13-FSI), ethyl-dimethyl-propyl-ammonium-bis(trifluoromethylsulfonyl)imide (PDEA-TFSI), 1-(methoxyethyl)-1-methylpiperidinium-bis (trifluoromethylsulfonyl)imide (MOEMPP-TFSI), and mixtures thereof.

In still a further embodiment, the at least one organic solvent comprises at least one of THF, dimethoxyethane, ethyl diglyme, and butyl diglyme.

According to another aspect, the invention relates to a non-aqueous electrolyte solution for use in an electrochemical cell. The non-aqueous electrolyte solution comprises at least one organic solvent; and a magnesium halide complex that is a reaction product of magnesium halide and another inorganic salt containing a polyatomic monovalent anion of anodic stability limit greater than 2.5 V vs. Mg/Mg$^{2+}$.

In one embodiment, the magnesium salt containing a polyatomic monovalent anion of anodic stability limit greater than 2.5 V vs. Mg/Mg$^{2+}$ is selected from the group of polyatomic monovalent anions described in Table I, and mixtures thereof.

In another embodiment, the magnesium halide is a magnesium chloride.

In yet another embodiment, the magnesium halide to magnesium salt ratio is in the range from 4:1 and 1:4.

In still another embodiment, a Mg molarity is in the range from 0.1 M to 2 M.

In a further embodiment, a solution conductivity is greater than 1 mS/cm at 25 degrees Celsius.

In yet a further embodiment, a solution Coulombic efficiency is greater than 98% at 25 degrees Celsius.

In an additional embodiment, the at least one organic solvent is a solvent selected from the group consisting of an ether, an organic carbonate, a lactone, a ketone, a glyme, a nitrile, an ionic liquid, an aliphatic hydrocarbon solvent, an aromatic hydrocarbon solvent and an organic nitro solvent, and mixtures thereof.

In one more embodiment, the at least one organic solvent is a solvent selected from the group consisting of THF, 2-methyl THF, dimethoxyethane, diglyme, triglyme, tetraglyme, diethoxyethane, diethylether, proglyme, ethyl diglyme, butyl diglyme, dimethylsulfoxide, dimethylsulfite, sulfolane, ethyl methyl sulfone, acetonitrile, hexane, toluene, nitromethane, 1-3 dioxalane, 1-4 dioxane, trimethyl phosphate, tri-ethyl phosphate, hexa-methyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), 1-(methoxyethyl)-1-methylpiperidinium-bis(trifluoromethylsulfonyl)imide (MOEMPP-TFSI), and mixtures thereof.

In still a further embodiment, the at least one organic solvent comprises at least one of THF, dimethoxyethane, ethyl diglyme, and butyl diglyme.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

An electrolyte is described for use in electrochemical cells that transfer Mg-ions between electrodes. The properties of the electrolyte include high conductivity, high Coulombic efficiency, and an electrochemical window that can exceed 3.5 V vs. Mg/Mg$^{2+}$. The use of an inorganic salt complex in an electrolyte promotes the substantially reversible deposition of magnesium metal on the anode current collector and the reversible intercalation of magnesium in the cathode material. It is expected that the systems, materials, and methods described will provide an improved non-aqueous electrolyte that allows the production of a practical, rechargeable magnesium battery which is expected to be safer and cleaner, and more durable, efficient and economical than heretofore known.

We now provide example electrolytes that are expected to be suitable for Mg-based secondary battery systems. In particular, materials contemplated for use in the electrolytes of the invention can be described by the general formula Mg$_2$X$_3$Z, where X is a monovalent negative ion such as a halide (e.g., F$^{-1}$, Cl$^{-1}$, Br$^{-1}$, I$^{-1}$), and Z is a polyatomic monovalent negative ion. Examples of polyatomic monovalent anions that are believed to be useful in practicing the invention include, but are not limited to, those described in Table I, and mixtures thereof.

TABLE I

| Chemical name | Acronym | Formula |
|---|---|---|
| bis(perfluoroalkylsulfonyl)imides | | N((C$x$F$_{2x+1})_x$SO$_2)_2^{-1}$ |
| bis(fluorosulfonyl)imide | FSI (x = 0) | N(SO$_2$F)$_2^{-1}$ |
| bis(trifluoromethanesulfonyl)imide | TFSI (x = 1) | N(CF$_3$SO$_2)_2^{-1}$ |
| bis(perfluoroethylsulfonyl)imide | BETI (x = 2) | N(C$_2$F$_5$SO$_2)_2^{-1}$ |
| Dicyanamide | DCA | N(CN)$_2^{-1}$ |
| Tricyanomethide | TCM | C(CN)$_3^{-1}$ |
| tetracyanoborate | TCB | B(CN)$_4^{-1}$ |
| 2,2,2,-trifluoro-N-(trifluoromethylsulfonyl)acetamide | | N(CF$_3$SO$_2$)(CF$_3$CO)$^{-1}$ |
| tetrafluoroborate | | BF$_4^{-1}$ |
| hexafluorophosphate | | PF$_6^{-1}$ |
| triflate | | CF$_3$SO$_3^{-1}$ |
| bis(oxalate)borate | BOB | B(C$_2$O$_4)_2^{-1}$ |
| perchlorate | | ClO$_4^{-1}$ |
| hexafluoroarsenate | | AsF$_6^{-1}$ |
| Hexafluoroantimonate | | SbF$_6^{-1}$ |
| Perfluorobutylsulfonate | | (C$_4$F$_9$SO$_3)^{-1}$ |
| Tris(trifluoromethanesulfonyl)methide | | C(CF$_3$SO$_2)_3^{-1}$ |

TABLE I-continued

| Chemical name | Acronym | Formula |
|---|---|---|
| trifluoroacetate | | $CF_3CO_2^{-1}$ |
| heptafluorobutanoate | | $C_3F_7CO_2^{-1}$ |
| thiocyanate | | $SCN^{-1}$ |
| triflinate | | $CF_3SO_2^{-1}$ |

Example 1

Figure 1:
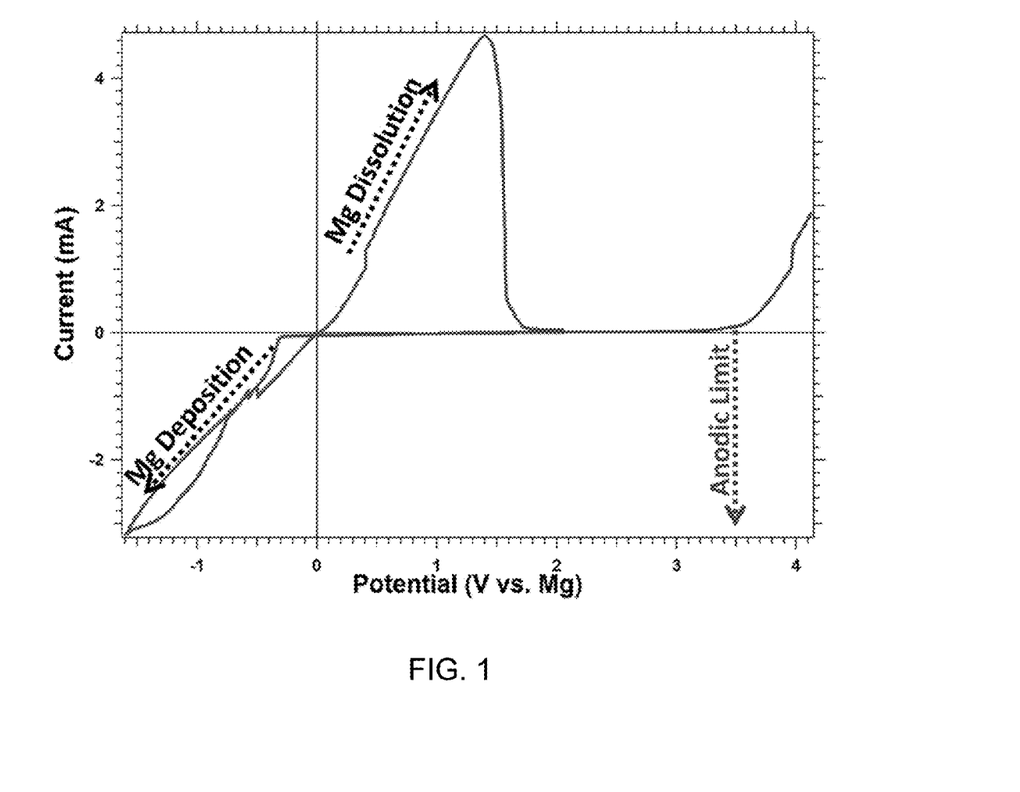
FIG. 1 is a graph displaying a typical cyclic voltammogram of the all-inorganic Mg complex resulting from reaction of MgCl$_2$ and Mg(TFSI)$_2$ dissolved in a mixture of 1,2-dimethoxymethane (DME) and tetrahydrofuran (THF).

FIG. 1 is a graph displaying a typical cyclic voltammogram of the $Mg_2Cl_3$-TFSI complex resulting from reaction of $MgCl_2$ and $Mg(TFSI)_2$. Solutions utilize a mixture of 1,2-dimethoxymethane (DME) and tetrahydrofuran (THF) as the solvent and Platinum as the working electrode while Magnesium serves as both the auxiliary and reference electrodes.

The data depicted in FIG. 1 shows the potentiodynamic behavior of $Mg_2Cl_3$-TFSI complex salt obtained with DME/THF solution from the reaction of $3\ MgCl_2 + Mg[N(CF_3SO_2)_2]_2$. The experiment utilized a scan rate of 25 mV/s, a platinum working electrode, and Mg for the counter and reference electrodes. The anodic stability of the solution is about 3.5 V vs. the onset of Mg dissolution. This is significantly higher than previous electrolytic solutions capable of reversibly plating Mg. The peak displaying maximum current density at $-1.3$ V is attributed to the deposition of magnesium metal while the peak with maximum current density at about 1.8 V is attributed to the subsequent electrochemical dissolution of the magnesium metal. The electrochemical window obtained with this system exceeds 3.5 V vs. the onset of Mg dissolution. $Mg_2Cl_3$-TFSI is one preferred embodiment of a complex salt useful in an electrolyte according to principles of the invention.

Example 2

Figure 2:
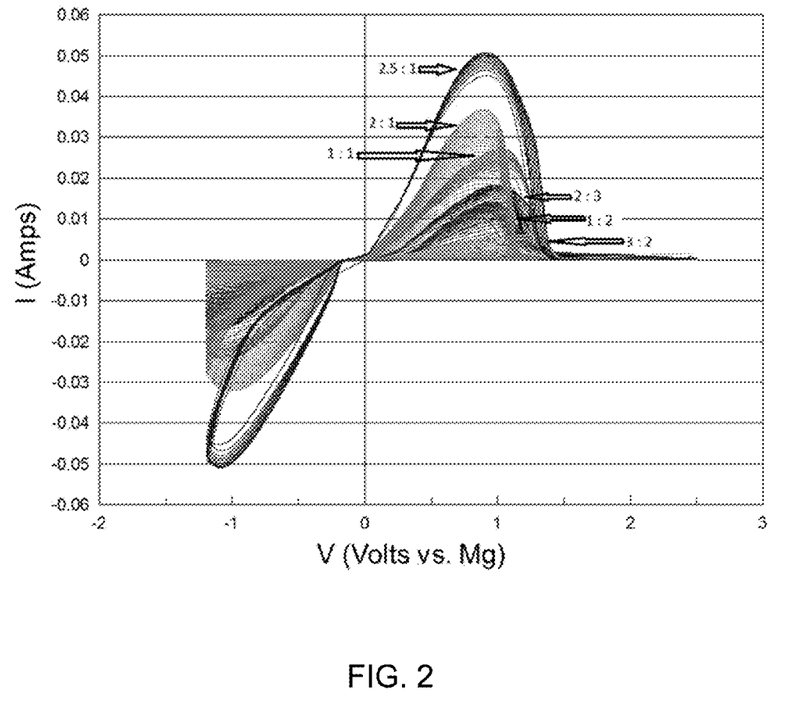
FIG. 2 is a graph displaying comparison of typical cyclic voltammograms of the inorganic magnesium salt complex resulting from reaction of MgCl$_2$ and Mg(TFSI)$_2$ when the mole ratio is varied between the two reactants.

FIG. 2 is a graph displaying a typical cyclic voltammograms of the inorganic magnesium salt complex resulting from reaction of $MgCl_2$ and $Mg(TFSI)_2$ when the mole ratio is varied between the two reactants. Solutions utilize 1,2-dimethoxymethane (DME) as the solvent. The experiment utilized a scan rate of 25 mV/s, a platinum working electrode, and Mg for the counter and reference electrodes. The mole ratio of $MgCl_2$ to $Mg(TFSI)_2$ ranges from 1:2 to 2.5:1 in this salt solution. A high degree of reversibility and Coulombic efficiency is present in each composition depicted in FIG. 2. Furthermore the Mg deposition and stripping occurs with low overpotential. Table II below demonstrates that solutions of mole ratio for $MgCl_2$ to $Mg(TFSI)_2$ ranging from 1:2 to 2.5:1 exhibit high solution conductivity; all samples being greater than 1 mS/cm at this molarity of magnesium and room temperature. Electrolyte solutions for secondary magnesium batteries, which are the product of magnesium halide (e.g., $MgCl_2$) and another inorganic salt (e.g., $Mg(TFSI)_2$) containing an inorganic polyatomic monovalent anion is one preferred embodiment of a complex salt useful in an electrolyte according to principles of the invention. In another preferred embodiment these inorganic Magnesium halide complex solutions display high conductivity of >1 mS/cm at 25 degrees Celsius.

TABLE II

| Mole Ratio of MgCl2 to MgTFSI2 | Conductivity |
|---|---|
| 1:4 | 2.90 mS/cm @ 28.0 C. |
| 1:2 | 3.73 mS/cm @ 28.5 C. |
| 2:3 | 4.16 mS/cm @ 28.5 C. |
| 1:1 | 5.04 mS/cm @ 28.0 C. |
| 3:2 | 5.31 mS/cm @ 28.5 C. |
| 2:1 | 5.55 mS/cm @ 28.3 C. |
| 2.5:1 | 5.80 mS/cm @ 28.2 C. |

Example 3

Figure 3:
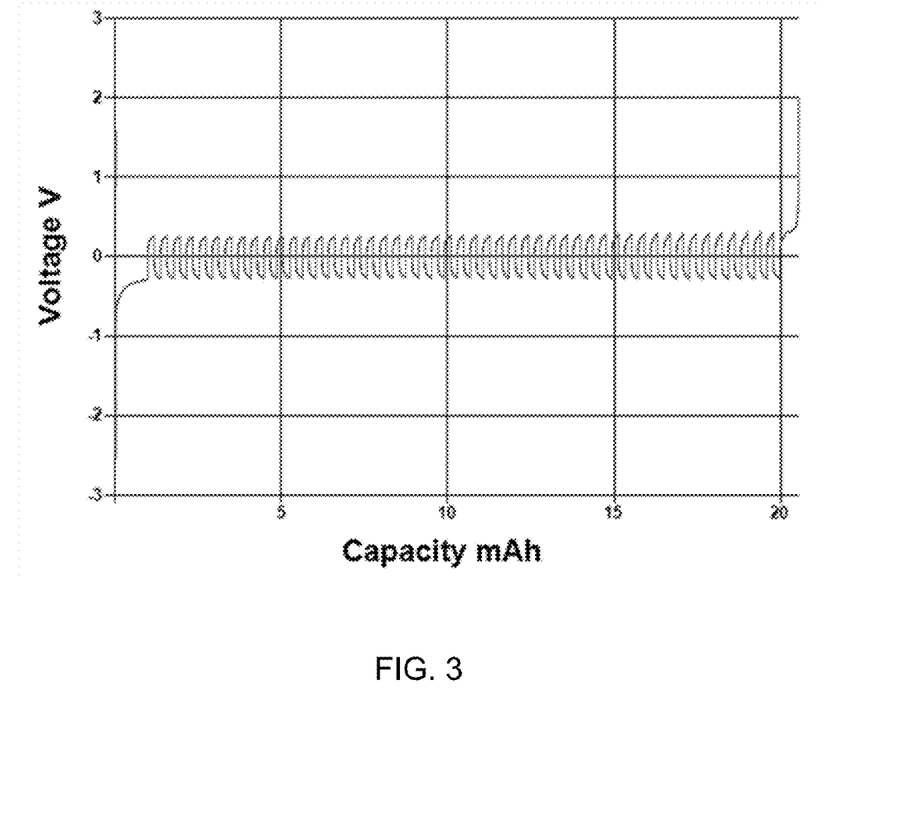
FIG. 3 is a graph displaying a typical macrocoulometry cycling data for the inorganic magnesium salt complex Mg$_3$Cl$_4$(TFSI) resulting from reaction of 2MgCl$_2$ and 1 Mg(TFSI)$_2$ in a mixed solution of 1,2-dimethoxymethane (DME) and N,N-propyl-methyl-pyrrolidinium-bis(trifluoromethylsulfonyl)imide (P13-TFSI) ionic liquid.

FIG. 3 is a graph displaying a typical macrocoulometry cycling data for the inorganic magnesium salt complex $Mg_3Cl_4(TFSI)$ resulting from reaction of $2MgCl_2$ and $1\ Mg(TFSI)_2$ in a mixed solution of 1,2-dimethoxymethane (DME) and N,N-propyl-methyl-pyrrolidinium-bis(trifluoromethylsulfonyl)imide (P13-TFSI) ionic liquid. The two-electrode experiment utilized galvanostatic cycling at 1 $mA/cm^2$ to deposit about 2 microns of Magnesium onto a platinum working electrode from an Mg counter electrode. Subsequently 20% of the Mg layer is stripped and re-electrodeposited for 50 cycles prior to stripping the remaining 80% of Mg. The Coulometric efficiency of this process mimics deep cycling in a commercial cell. In FIG. 3 the average Coulometric efficiency over 50 cycles is 98.92%. Furthermore the cycling occurs with low overpotential to Mg deposition and Mg stripping. The high Coulombic efficiency, high degree of reversibility, and low polarization depicted in FIG. 3 is typical for preferred embodiments of these solutions. According to principles of the invention, inorganic magnesium electrolyte solutions for secondary magnesium batteries with Coulombic efficiency >98%, which are the product of magnesium halide (e.g., $MgCl_2$) and another inorganic salt (e.g., $Mg(TFSI)_2$) containing an inorganic polyatomic monovalent anion is one preferred embodiment of a complex salt.

Example 4

Figure 4:
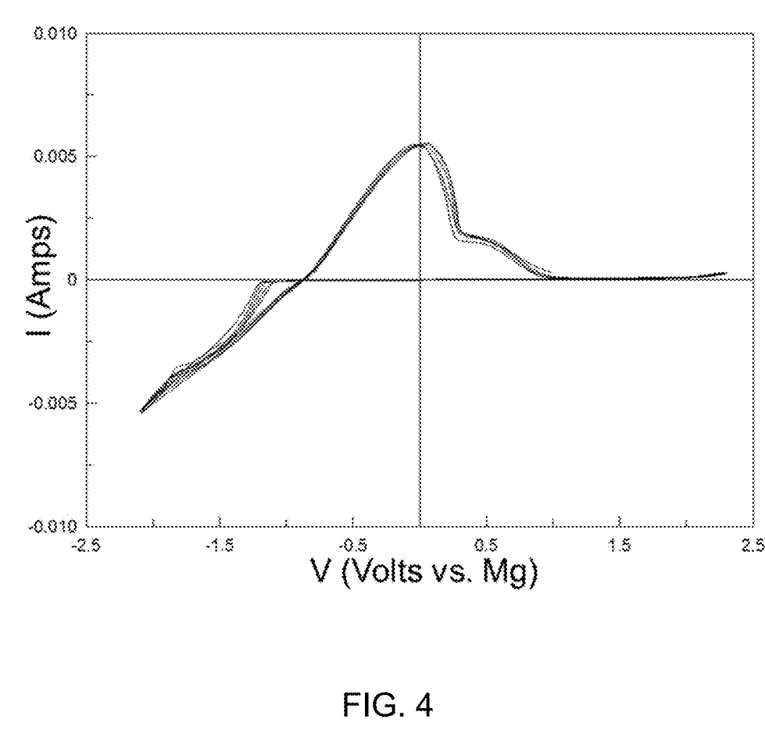
FIG. 4 is a graph displaying a typical cyclic voltammograms of the inorganic magnesium salt complex resulting from reaction of MgCl$_2$ and Mg(TFSI)$_2$ when the solvent utilized is a combination of butyl diglyme and the ionic liquid N,N-propyl-methyl-pyrrolidinium-bis(trifluoromethylsulfonyl)imide.

FIG. 4 is a graph displaying a typical cyclic voltammograms of the inorganic magnesium salt complex resulting from reaction of $MgCl_2$ and $Mg(TFSI)_2$ when the solvent utilized is a combination of butyl diglyme and the ionic liquid N,N-propyl-methyl-pyrrolidinium-bis(trifluoromethylsulfonyl)imide. The experiment utilized a scan rate of 25 mV/s, a platinum working electrode, and Mg for the counter and reference electrodes. The mole ratio of $MgCl_2$ to $Mg(TFSI)_2$ is about 2:1 in this inorganic salt solution. To one practiced in the art, the voltammogram in FIG. 4 shows a high degree of reversibility and Coulombic efficiency, and the Mg deposition and stripping occurs with low overpotential. Such solutions are expected to provide much improved safety over previous organometallic-based Mg electrolytes due to not only the inorganic nature of the salt complex, but also the favorable vapor pressure and flash point of the solvents utilized.

Example 5

The formation of an electrochemically active $Mg_2Cl_3$-TFSI solution can be dependent upon ascertaining proper conditions for some or all of the following non-limiting examples of solution variables: the mole ratio of Mg:Cl:TFSI (or other anodically stable anion), overall molarity, solvent properties, precursor and solvent purity, and reaction conditions. In one preferred embodiment, a suitable complex is prepared by reacting $MgCl_2$ with a compound containing bis(trifluoromethanesulfonyl)imide. In a typical preparation of an electrochemically active $Mg_2Cl_3$-TFSI solution such as 0.25 M $Mg_2Cl_3$-TFSI, one may perform the following reaction:

Eq. (1)

Place both ~1.758 g $MgCl_2$ powder (99.99%) and ~2.016 g $Mg[N(CF_3SO_2)_2]_2$ (min. 97%) into a single glass container with a stir bar under inert atmosphere. Thereafter add 30.0 ml of tetrahydrofuran (THF, anhydrous <20 ppm $H_2O$) and 20.0 ml of 1,2-dimethoxymethane (DME, anhydrous <20 ppm $H_2O$). Subsequently stir for a time in the range from one to twenty-four hours at a temperature above room temperature after which solution may be returned to room temperature. In some cases it is preferential to heat the sample to 30.0° Celsius or more while stirring in order to facilitate reaction of the materials. The resulting solution is clear or slightly cloudy or translucent with no precipitation. In some embodiments it is preferable to rigorously stir over Mg metal powder in order to condition the solution for improved electrochemical response by reducing residual water and other impurities.

The product can be described as $Mg_2Cl_3[N(CF_3SO_2)_2]$ salt or more generally as a magnesium halide cation complex or more specifically as a $Mg_2Cl_3$-TFSI complex solution. In some embodiments it may be preferable to note the coordination solvent molecules to the complex cation. The product of this reaction enables reversible, facile electrochemical plating and stripping of Mg ions onto an electrode while maintaining a high anodic stability, and these advantageous electrochemical characteristics are achieved without the use of Grignard reagents, organometallic materials, or Lewis acid derived anions including tetrachloroaluminate or tetraphenylborate.

If X represents a halide, and Z represents an inorganic polyatomic monovalent ion, such as the non-limiting examples of anions listed in Table I, it is possible to generalize formulas the complexes or compounds that are expected to be useful in electrolytes for secondary Mg batteries, for electrochemical cells having a Mg electrode and in energy storage devices having a Mg electrode. Such generalized formulas are given in Table III, along with specific examples for different integer values of the variable n.

ments, the electrolyte salt complex can have an Mg concentration of greater than 0.1 M for Mg.

In one or more embodiments a non-aqueous electrolyte for use in an electrochemical cell includes at least one organic solvent and at least one electrolytically active, soluble, magnesium (Mg) salt complex represented by the formula $Mg_{n+1}Cl_{(2*n)}Z_2$, in which Z is selected from the group of monovalent negative complex ions described in Table I or mixtures thereof; and n is in the range from one to four. The electrolyte salt complex can be used at any concentration; however, in certain embodiments, the Mg molarity, e.g., concentration, ranges up to 1 M. In one or more embodiments, the electrolyte salt complex is expected to have a Mg concentration of about 0.25 to about 0.5 M. In a few additional embodiments, the electrolyte salt complex is expected to have a Mg concentration of greater than 1 M.

Surprisingly, it has been proposed that the voltage at which the anodic electrolyte decomposition occurs is set by the breaking of metal-organic bonds. In addition, chlorinated anions such as tetrachloroaluminate limit the anodic stability to ~3 V vs. $Mg/Mg^{2+}$. In order to surpass the energy density limitations of current state-of-the-art one needs an electrolyte capable of higher voltage stability while maintaining the ability to electrochemically deposit and strip Mg-ions in facile, reversible manner.

While not being bound by any particular mode of operation, it is hypothesized that the capability for reversible Mg deposition is accomplished via the formation of $MgCl^+$ and/or $Mg_2Cl_3^+$ and/or $Mg_3Cl_4^+$ clusters in solution. Cationic species using other halides, such as $MgBr^+$ and/or $Mg_2Br_3^+$ clusters, and $MgF^+$ and/or $Mg_2F_3^+$ clusters may also be suitable for reversible Mg deposition.

Although $MgCl_2$ is generally regarded as insoluble or poorly soluble in many organic solvents, it is possible to prepare non-aqueous electrolyte solution including magnesium chloride complexes and in particular using $Mg_2Cl_3$-TFSI, wherein the Mg molarity, e.g., concentration, ranging up to 2 M, and for example at about 0.1 to about 0.5 M for Mg.

Other anions with high anodic stability may be used, as long as they meet the requirements of electrochemical stability throughout the voltage window of cell operation.

A variety of organic solvents are suitable for use in the electrolyte of the present invention. The organic solvents can be used alone or in combination. Whether a solvent comprises a single organic composition or a plurality of organic com-

TABLE III

| Formula | Value of n | Compound or Complex | Equivalent Cation and Anion Species | Example in Which X = Cl and Z = TFSI |
|---|---|---|---|---|
| $Mg_{n+1}X_{2n}Z_2$ | 0 | $MgZ_2$ | $Mg^{2+} + 2Z^-$ | $Mg^{2+} + 2(TFSI)^-$ |
| | 1 | $Mg_2X_2Z_2$ | $2MgX^+ + 2Z^-$ | $2MgCl^+ + 2(TFSI)^-$ |
| | 2 | $Mg_3X_4Z_2$ | $MgX^+ + Mg_2X_3^+ + 2Z^-$ | $MgCl^+ + Mg_2Cl_3^+ + 2(TFSI)^-$ |
| | 3 | $Mg_4X_6Z_2$ | $2Mg_2X_3^+ + 2Z^-$ | $2Mg_2Cl_3^+ + 2(TFSI)^-$ |
| | 4 | $Mg_5X_8Z_2$ | $MgX_2 + 2Mg_2X_3^+ + 2Z^-$ | $MgCl_2 + 2Mg_2Cl_3^+ + 2(TFSI)^-$ |

The non-aqueous electrolyte solution including $Mg_2Cl_3$-TFSI can employ $MgCl_2$ and $Mg[N(CF_3SO_2)_2]_2$ over a range of proportions to provide formation of $Mg^{2+}$, $Mg_2Cl_3^+$, $MgCl^+$ and $MgCl_2$, or mixtures thereof. In certain embodiments, the $MgCl_2:Mg(TFSI)_2$ ratio is in the ratio of 1:4 to 5:1 with preferable ratios being 4:1, 3:1, 2:1 or any ratio between. For example, any non-whole number proportion in the range from 5:1 to 1:1 may also be used. In one or more embodipositions, for the purposes of further exposition, the organic solvent will be referred to as "the solvent" in the singular. In order to provide for the reversible dissolution and plating of Mg, the solvent advantageously should provide appreciable solubility by coordination of the constituent inorganic salts of Mg. Further the solvent preferably should not reduce above the Mg plating potential, so as to form products which inhibit migration of Mg from solution to the electrode surface. In various embodiments, suitable solvents include ethers and tertiary amines, and may also include organic carbonates, lactones, ketones, glymes, nitriles, ionic liquids, aliphatic and aromatic hydrocarbon solvents and organic nitro solvents. More specifically, suitable solvents include THF, 2-methyl THF, dimethoxyethane, diglyme, triglyme, tetraglyme, diethoxyethane, diethylether, proglyme, ethyl diglyme, butyl diglyme, dimethylsulfoxide, dimethylsulfite, sulfolane, ethyl methyl sulfone, acetonitrile, hexane, toluene, nitromethane, 1-3 dioxalane, 1-3 dioxane, 1-4 dioxane, trimethyl phosphate, tri-ethyl phosphate, hexa-methyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), and 1-(methoxyethyl)-1-methylpiperidinium-bis(trifluoromethylsulfonyl)imide (MOEMPP-TFSI).

In one or more embodiments, the solvent that enables reversible, electrochemical deposition and stripping of Mg from a solution containing the reaction product(s) of $MgCl_2$ and $Mg(TFSI)_2$ is a THF, dimethoxyethane, ethyl diglyme, butyl diglyme, or a mixture thereof.

The reaction described above is motivated by an effort to surpass the high voltage and safety limitations of previous organometallic-based electrolytic solutions. However, it would appear that the result observed comes as a surprise to one of ordinary skill in the relevant art, for three reasons: First, electrolyte solutions previously shown to reversibly electrodeposit Mg metal at or near room temperature generally required the utilization of Grignard reagent, or another organometallic reagent with metal-organic bonds. One practiced in the art will recognize that previous attempts to utilize inorganic magnesium salts failed to enable substantial reversibility of magnesium deposition with high Coulombic efficiency and low overpotential, but instead resulted in decomposition of the solution components. Second, the low solubility of $MgCl_2$ in various solvents led others to conclude co-dissolution and reaction was not favorable. And third, $MgCl_2$ is a chemically inert inorganic magnesium salt. It does not dissociate in based on aprotic organic solvents to appreciable extent and displays little to no conductivity in ethereal solution. Furthermore, $MgCl_2$ alone is electrochemically inactive in such ethereal solutions, enabling only negligible Mg deposition, dissolution or intercalation.

The magnesium electrolyte salt can be prepared by combining a source of magnesium cation, e.g., a magnesium halide, and a source of an anion stable at high voltage, based on the anion Z in the electrolyte solvent with stirring and heating. Exemplary reaction times include 1, 5, 10, 12, 24, 48 and 72 hours; exemplary reaction temperatures include between 20 and 50 degrees Celsius. Heating under inert or reduced atmosphere is preferred to avoid water contamination and formation of oxide species.

In some embodiments, it is preferable to condition the solution prior to use in an electrochemical cell, by elimination or mitigation of harmful species inevitable found in the raw materials and/or the as-prepared solution. In some embodiments, additives are provided in the electrolyte to mitigate the deleterious species, without the production of side reaction or unwanted, harmful chemicals. Water, oxygen, and peroxide(s) are non-limiting examples of deleterious species.

Solution Conditioning

Solution conditioning is accomplished by control of variables including, but not limited to, cation:anion ratio, constituent molarity, choice of solvent or solvents, precursor and solvent purity, impurity removal, reaction temperature, time, mixing, and electrochemical conditions can yield a solution containing an all inorganic salt capable of reversible deposition of Mg. The electrolyte can be conditioned using a variety of processes, including physical, chemical and electrochemical process.

The process of conditioning includes the following non-limiting examples.

Physical processes that enable a high degree of Mg complex formation and removal of deleterious species/impurities including: heating, freezing, distillation, maintaining an $MgCl_2:MgZ_2$ ratio between 1:1 and 4:1, maintaining molarities that saturate the solution, etc. In some embodiments, the electrolyte solution is heated to help the dissolution of the Mg salts. In some embodiments, the $MgCl_2:MgZ_2$ ratio is adjusted so that a saturated electrolyte solution with high concentration of the electrolytically active Mg salt complex is obtained. In some specific embodiments, the $MgCl_2:MgZ_2$ ratio is 1:1, 2:1, 3:1, or 4:1 or any non-integer value in between. Similarly, in the case where Z is an anion other than bis(trifluoromethylsulfonyl)imide, the $MgCl_2:MgZ_2$ ratio can be adjusted to result in a high concentration of electrolytically active Mg salt complex. Non-limiting examples of the $MgCl_2:MgZ_2$ with any ratio between 4:1 and 1:4.

Chemical processes in order to remove deleterious species such as addition of minute quantities of proton/water scavengers, such as Grignard reagents, $AlCl_3$, organoaluminum, molecular sieves, gamma-alumina, silica, Magnesium metal, etc.

Electrochemical processes like potentiostatic, potentiodynamic or galvanostatic electrolysis that enable a high degree of Mg complex formation and removal of deleterious species/impurities. This can be accomplished at reducing or oxidizing potentials, which reduce or oxidize deleterious species and/or drive the reaction of reactants to products. It can be exercised with inert electrodes, sacrificial electrodes, like Mg or, within a complete cell, with an auxiliary electrode or with the cathode serving as the working electrode. In some specific embodiments, the electrolyte is subjected to multiple cycles of potentiostatic, potentiodynamic or galvanostatic electrolysis. In some specific embodiments, the electrolyte is potentiostatically polarized for 5 cycles, 10 cycles, 15 cycles, 20 cycles, or 30 cycles.

In one or more embodiments, the electrolyte salt solution is conditioned to improve the electrochemical properties through electrochemical polarization.

In one or more embodiments, the electrolyte salt solution is conditioned to improve the electrochemical properties by reacting with insoluble active metals, such as metallic Mg, Al, Ca, Li, Na, or K, and/or reacting with insoluble acids/bases, and by being exposed to adsorbing agents such as molecular sieves, $CaH_2$, alumina, silica, $MgCO_3$, and similar absorptive materials.

In one or more embodiments, the electrolyte salt solution is conditioned to improve the electrochemical properties by providing additives to scavenge contaminants. The contaminants that can be scavenged include but are not limited to organo-Mg compounds, organo-Al compounds, organo-B compounds, organometallics, trace water, oxygen, $CO_2$, and protic contaminants such as acids.

As described above, the electrochemical window of a cell with an electrolyte as described herein and an appropriate anode-cathode pair has been observed to be 3.5-3.6 volts.

It is expected that the electrolytic solutions described and contemplated herein can be used in such devices as electrochemical cells, secondary (e.g., rechargeable) batteries, and energy storage devices that include, in addition to the electrolyte, an anode and a cathode. In some embodiments, an electrochemical cell can include a metal anode and an intercalation cathode.

In one or more embodiments, a secondary battery includes the electrolyte according to the present invention, a magnesium metal anode and a magnesium insertion compound cathode.

In one or more embodiments, a secondary battery includes the electrolyte according to the present invention, a magnesium metal anode and a conversion, or displacement compound cathode.

In one or more embodiments, the magnesium insertion-compound cathode includes a magnesium-Chevrel intercalation cathode of the formula, $Mo_6S_8$.

The electrolyte composition of the present invention includes an organic solvent and electrochemically-active, soluble, inorganic salt complex represented by the formula $Mg_{n+1}Cl_{(2*n)}Z_2$, in which Z is selected from the compounds described in Table I or mixtures thereof; and n is in the range from one to four.

Inorganic salts of this form may, in certain cases, be combined with compatible organometallic salts or with compatible inorganic salts of other forms.

Intercalation cathodes used in conjunction with the electrolyte according to the present invention preferably include transition metal oxides, transition metal oxo-anions, chalcogenides, and halogenides and combinations thereof. Non-limiting examples of positive electrode active material for the Mg battery include Chevrel phase $Mo_6S_8$, $MnO_2$, CuS, $Cu_2S$, $Ag_2S$, $CrS_2$, $VOPO_4$, layered structure compounds such as $TiS_2$, $V_2O_5$, $MgVO_3$, $MoS_2$, $MgV_2O_5$, $MoO_3$, Spinel structured compounds such as $CuCr_2S_4$, $MgCr_2S_4$, $MgMn_2O_4$, $MgNiMnO_4$, $Mg_2MnO_4$, NASICON structured compounds such as $MgFe_2(PO_4)_3$ and $MgV_2(PO_4)_3$, Olivine structured compounds such as $MgMnSiO_4$ and $MgFe_2(PO_4)_2$, Tavorite structured compounds such as $Mg_{0.5}VPO_4F$, pyrophosphates such as $TiP_2O_7$ and $VP_2O_7$, and fluorides such as $MgMnF_4$ and $FeF_3$.

In some embodiments, the positive electrode layer further comprises an electronically conductive additive. Non-limiting examples of electronically conductive additives include carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, or mesocarbon microbeads.

In some embodiments, the positive electrode layer further comprises a polymer binder. Non-limiting examples of polymer binders include poly-vinylidene fluoride (PVdF), poly (vinylidene fluoride-co-hexafluoropropene) (PVdF-HFP), Polytetrafluoroethylene (PTFE), Kynar Flex 2801, Kynar Powerflex LBG, and Kynar HSV 900, or Teflon.

Negative electrodes used in conjunction with the present invention comprise a negative electrode active material that can accept Mg-ions. Non-limiting examples of negative electrode active material for the Mg battery include Mg, Mg alloys such as AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, or insertion materials such as Anatase $TiO2$, rutile $TiO2$, $Mo_6S_8$, $FeS_2$, $TiS_2$, $MoS_2$.

In some embodiments, the negative electrode layer further comprises an electronically conductive additive. Non-limiting examples of electronically conductive additives include carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, or mesocarbon microbeads.

In some embodiments, the negative electrode layer further comprises a polymer binder. Non-limiting examples of polymer binders include poly-vinylidene fluoride (PVdF), poly (vinylidene fluoride-co-hexafluoropropene) (PVdF-HFP), Polytetrafluoroethylene (PTFE), Kynar Flex 2801, Kynar Powerflex LBG, and Kynar HSV 900, or Teflon.

In some embodiments, the Mg battery used in conjunction with the electrolyte described herein comprises a positive electrode current collector comprising carbonaceous material, or a current collector comprising a metal substrate coated with an over-layer to prevent corrosion in the electrolyte. In some embodiments, the Mg battery described herein comprises a negative electrode current collector comprising carbonaceous material. In other embodiments, the Mg battery described herein comprises positive and negative electrode current collectors comprising carbonaceous material.

In some embodiments, the Mg battery disclosed herein is a button or coin cell battery consisting of a stack of negative electrode, porous polypropylene or glass fiber separator, and positive electrode disks sit in a can base onto which the can lid is crimped. In other embodiments, the Mg battery used in conjunction with the electrolyte disclosed herein is a stacked cell battery. In other embodiments, the Mg battery disclosed herein is a prismatic, or pouch, cell consisting of one or more stacks of negative electrode, porous polypropylene or glass fiber separator, and positive electrode sandwiched between current collectors wherein one or both current collectors comprise carbonaceous materials, or a metal substrate coated with an over-layer to prevent corrosion in the electrolyte. The stack(s) are folded within a polymer coated aluminum foil pouch, vacuum and heat dried, filled with electrolyte, and vacuum and heat sealed. In other embodiments, the Mg battery disclosed herein is a prismatic, or pouch, bi-cell consisting of one or more stacks of a positive electrode which is coated with active material on both sides and wrapped in porous polypropylene or glass fiber separator, and a negative electrode folded around the positive electrode wherein one or both current collectors comprise carbonaceous materials. The stack(s) are folded within a polymer coated aluminum foil pouch, dried under heat and/or vacuum, filled with electrolyte, and vacuum and heat sealed. In some embodiments of the prismatic or pouch cells used in conjunction with the electrolyte described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging.

In other embodiments, the Mg battery used in conjunction with the electrolyte disclosed herein is a wound or cylindrical cell consisting of wound layers of one or more stacks of a positive electrode which is coated with active material on one or both sides, sandwiched between layers of porous polypropylene or glass fiber separator, and a negative electrode wherein one or both current collectors comprise carbonaceous materials. The stack(s) are wound into cylindrical roll, inserted into the can, dried under heat and/or vacuum, filled with electrolyte, and vacuum and welded shut. In some embodiments of the cylindrical cells described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A non-aqueous electrolyte solution for use in an electrochemical cell, comprising:
    at least one organic solvent; and
    at least one electrolytically active, soluble, inorganic Magnesium (Mg) salt complex represented by the formula $Mg_{n+1}X_{(2*n)}Z_2$ in which n is in the range from one-quarter to four, X is a halide, and Z is an inorganic polyatomic monovalent anion.

2. The non-aqueous electrolyte solution of claim 1, wherein Z is a polyatomic monovalent anion selected from the group of polyatomic monovalent anions described in Table I, and mixtures thereof.

3. The non-aqueous electrolyte solution of claim 1, wherein n is in the range from 0.25 to 4, said halide is chlorine.

4. The non-aqueous electrolyte solution of claim 1, wherein n is in the range from 0.25 to 4, said halide is chlorine, and Z is $N(CF_3SO_2)_2^{-1}$.

5. The non-aqueous electrolyte solution of claim 1, a Mg molarity is in the range from 0.1 M to 2 M.

6. The non-aqueous electrolyte solution of claim 1, wherein a solution conductivity is greater than 1 mS/cm at 25 degrees Celsius.

7. The non-aqueous electrolyte solution of claim 1, a solution Coulombic efficiency is greater than 98% at 25 degrees Celsius.

8. The non-aqueous electrolyte solution of claim 1, wherein said at least one organic solvent is a solvent selected from the group consisting of an ether, an organic carbonate, a lactone, a ketone, a glyme, a nitrile, an ionic liquid, an aliphatic hydrocarbon solvent, an aromatic hydrocarbon solvent and an organic nitro solvent, and mixtures thereof.

9. The non-aqueous electrolyte solution of claim 1, wherein said at least one organic solvent is a solvent selected from the group consisting of THF, 2-methyl THF, dimethoxyethane, diglyme, triglyme, tetraglyme, diethoxyethane, diethylether, proglyme, ethyl diglyme, butyl diglyme, dimethylsulfoxide, dimethylsulfite, sulfolane, ethyl methyl sulfone, acetonitrile, hexane, toluene, nitromethane, 1-3 dioxalane, 1-4 dioxane, trimethyl phosphate, tri-ethyl phosphate, hexamethyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), 1-(methoxyethyl)-1-methylpiperidinium-bis(trifluoromethylsulfonyl)imide (MOEMPP-TFSI), and mixtures thereof.

10. The non-aqueous electrolyte solution of claim 1, wherein said at least one organic solvent comprises at least one of THF, dimethoxyethane, ethyl diglyme, and butyl diglyme.

11. A non-aqueous electrolyte solution for use in an electrochemical cell comprising:
    at least one organic solvent; and
    a magnesium halide complex that is a reaction product of magnesium halide and another inorganic salt containing a polyatomic monovalent anion of anodic stability limit greater than 2.5 V vs. $Mg/Mg^{2+}$, wherein said magnesium halide to magnesium salt ratio is in the range from 4:1 and 1:4.

12. The non-aqueous electrolyte solution of claim 11, wherein said magnesium salt containing a polyatomic monovalent anion of anodic stability limit greater than 2.5 V vs. $Mg/Mg^{2+}$ is selected from the group of polyatomic monovalent anions described in Table I, and mixtures thereof.

13. The non-aqueous electrolyte solution of claim 11, wherein said magnesium halide is a magnesium chloride.

14. The non-aqueous electrolyte solution of claim 11, wherein said Mg molarity is in the range from 0.1 M to 2 M.

15. The non-aqueous electrolyte solution of claim 11, wherein a solution conductivity is greater than 1 mS/cm at 25 degrees Celsius.

16. The non-aqueous electrolyte solution of claim 11, wherein a solution Coulombic efficiency is greater than 98% at 25 degrees Celsius.

17. The non-aqueous electrolyte solution of claim 11, wherein said at least one organic solvent is a solvent selected from the group consisting of an ether, an organic carbonate, a lactone, a ketone, a glyme, a nitrile, an ionic liquid, an aliphatic hydrocarbon solvent, an aromatic hydrocarbon solvent and an organic nitro solvent, and mixtures thereof.

18. The non-aqueous electrolyte solution of claim 11, wherein said at least one organic solvent is a solvent selected from the group consisting of THF, 2-methyl THF, dimethoxyethane, diglyme, triglyme, tetraglyme, diethoxyethane, diethylether, proglyme, ethyl diglyme, butyl diglyme, dimethylsulfoxide, dimethylsulfite, sulfolane, ethyl methyl sulfone, acetonitrile, hexane, toluene, nitromethane, 1-3 dioxalane, 1-4 dioxane, trimethyl phosphate, tri-ethyl phosphate, hexamethyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), 1-(methoxyethyl)-1-methylpiperidinium-bis(trifluoromethylsulfonyl)imide (MOEMPP-TFSI), and mixtures thereof.

19. The non-aqueous electrolyte solution of claim 11, wherein said at least one organic solvent comprises at least one of THF, dimethoxyethane, ethyl diglyme, and butyl diglyme.

* * * * *